United States Patent
Gintis et al.

(10) Patent No.: US 10,666,541 B2
(45) Date of Patent: May 26, 2020

(54) METHODS, SYSTEMS, AND COMPUTER READABLE MEDIA FOR LINK AGGREGATION GROUP SWITCHOVER IN A NETWORK TESTING ENVIRONMENT

(71) Applicant: Keysight Technologies, Inc., Santa Rosa, CA (US)

(72) Inventors: Noah Steven Gintis, Westlake Village, CA (US); Vinod Joseph, Thousand Oaks, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 14 days.

(21) Appl. No.: 16/033,144

(22) Filed: Jul. 11, 2018

(65) Prior Publication Data

US 2020/0021510 A1   Jan. 16, 2020

(51) Int. Cl.
   *H04L 12/26*   (2006.01)

(52) U.S. Cl.
   CPC .......... *H04L 43/50* (2013.01); *H04L 43/0823* (2013.01)

(58) Field of Classification Search
   CPC ..... H04L 43/50; H04L 43/0823; H04L 43/00; H04B 3/46; H04B 17/00; H04W 24/00
   See application file for complete search history.

(56) References Cited

U.S. PATENT DOCUMENTS

| | | | | |
|---|---|---|---|---|
| 8,223,767 B2* | 7/2012 | Nanda | ............ | H04L 12/185 370/390 |
| 8,885,493 B2* | 11/2014 | Sundaram | ............ | H04L 43/50 370/235 |
| 9,491,083 B2* | 11/2016 | Brolin | ............ | H04L 43/50 |
| 2011/0069622 A1 | 3/2011 | Gintis et al. | | |
| 2012/0051259 A1 | 3/2012 | Gintis et al. | | |
| 2014/0226457 A1* | 8/2014 | Hsueh | ............ | H04L 43/50 370/216 |
| 2015/0106669 A1 | 4/2015 | Gintis | | |
| 2016/0050156 A1 | 2/2016 | Bergeron | | |
| 2018/0011955 A1 | 1/2018 | Gintis | | |

* cited by examiner

*Primary Examiner* — Sharad Rampuria

(57) ABSTRACT

A system includes a test controller configured for testing a device under test (DUT). Testing the DUT includes creating a link aggregation group (LAG) with the DUT, and the LAG includes a first link and a second link. The system includes a first traffic generator circuit including a first physical network port and a first port processor configured to transmit a first stream of test packets over the first link of the LAG. The system includes a second traffic generator circuit including a second physical network port and a second port processor configured to transmit a second stream of test packets over the second link of the LAG. The system is configured for instructing the first port processor to transmit both the first stream of test packets and the second stream of test packets on the first physical network port in response to detecting an anomaly on the second link.

18 Claims, 7 Drawing Sheets

METHODS, SYSTEMS, AND COMPUTER READABLE MEDIA FOR LINK AGGREGATION GROUP SWITCHOVER IN A NETWORK TESTING ENVIRONMENT

TECHNICAL FIELD

The subject matter described herein relates to testing networks and network devices. More particularly, the subject matter described herein relates to methods, systems, and computer readable media for link aggregation group (LAG) switchover in a data communications network testing environment.

BACKGROUND

Link aggregation generally refers to techniques that combine multiple network connections (e.g., Ethernet links) into one logical network connection which can be referred to as a link aggregation group (LAG). An example protocol for link aggregation is the link aggregation control protocol (LACP). LACP allows a network device to negotiate an automatic bundling of links by sending LACP packets to a network peer.

In order to test networks and network devices that implement LACP, network test systems need to support link aggregation. In particular, network test systems should support the feature that when a LAG link fails, the traffic running over that port is moved to one or more other LAG links in the LAG. Some conventional network test systems support this feature by designing the hardware circuitry of a test system load module/card so that hardware elements can recognize a group of links as comprising a LAG, sense a link failure within the LAG, and cause a hardware-level switchover of the failed link to another link of the LAG. This is only possible, however, when the number of links per LAG is small enough that the LAG could be handled by a single test system load module/card, so that these conventional test systems could not support larger LAG test scenarios.

Accordingly, in light of these difficulties there exists a need for improved methods, systems, and computer readable media for link aggregation group (LAG) switchover in a data communications network testing environment.

SUMMARY

The subject matter described herein includes methods, systems, and computer readable media for link aggregation group (LAG) switching in a network testing environment. A system includes a test controller configured for testing a device under test (DUT). Testing the DUT includes creating a link aggregation group (LAG) with the DUT, and the LAG includes a first link and a second link. The system includes a first traffic generator circuit including a first physical network port and a first port processor configured to transmit a first stream of test packets over the first link of the LAG. The system includes a second traffic generator circuit including a second physical network port and a second port processor configured to transmit a second stream of test packets over the second link of the LAG. The system is configured for instructing the first port processor to transmit both the first stream of test packets and the second stream of test packets on the first physical network port in response to detecting an anomaly on the second link.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
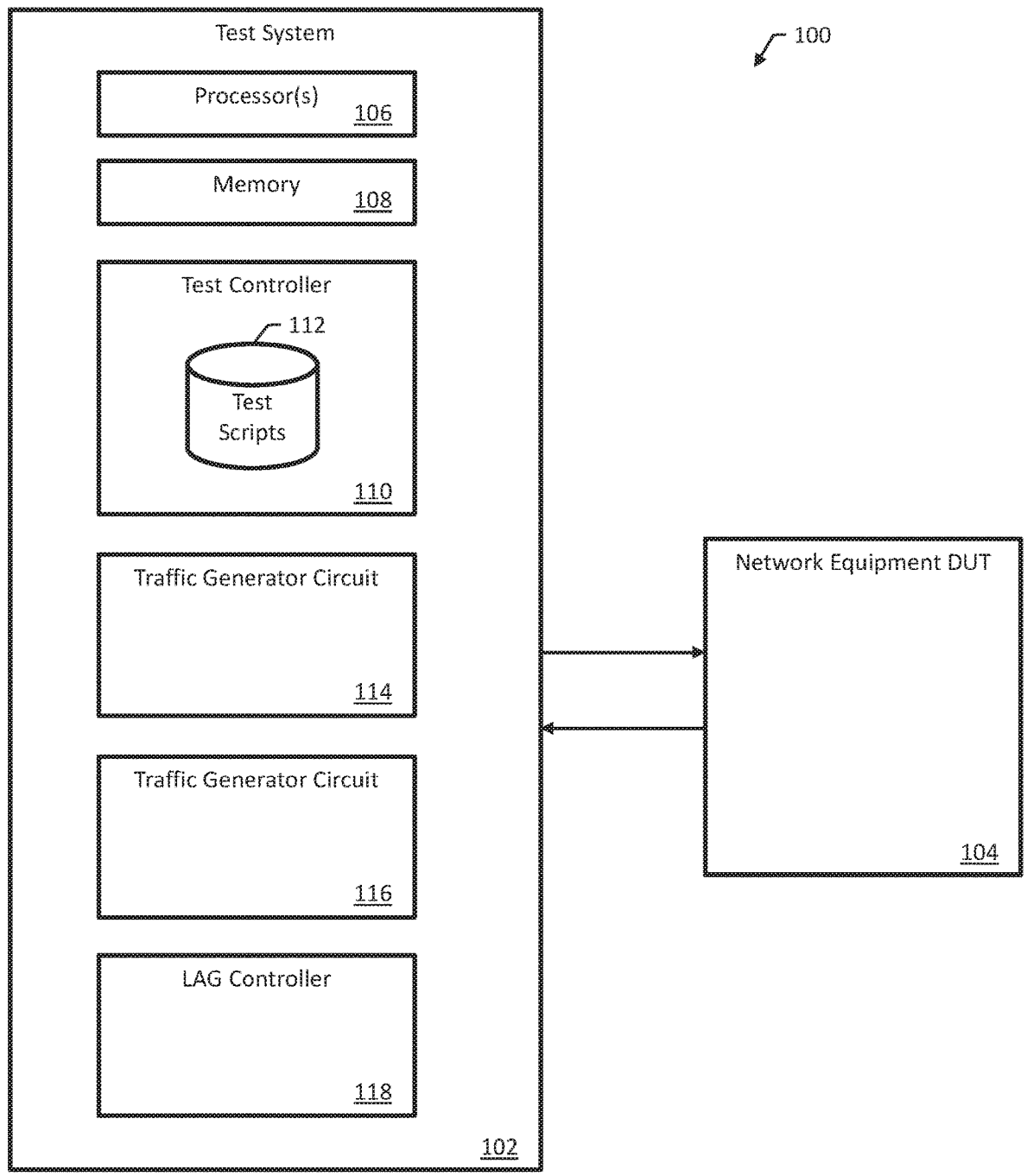
FIG. 1 illustrates an example network testing environment including a test system and a network equipment device under test (DUT)

The subject matter described herein relates to methods, systems, and computer readable media for link aggregation group (LAG) switchover in a data communications network testing environment. FIG. 1 illustrates an example network testing environment 100 including a test system 102 and a network equipment device under test (DUT) 104.

The test system 102 includes one or more processors 106 and memory storing executable instructions for the processors 106. The test system 102 includes a test controller 110 implemented using the processors 106 and memory 108.

The test controller 112 executes one or more test scripts 112 to test data communication networks and network equipment devices. For example, the test controller 112 can send one or more streams of test packets to the DUT 104, receive a stream of response test packets from the DUT 104 or another device in a data communication network, and then generate a test report for the DUT 104 based on the stream of response test packets.

The test system 102 includes at least two traffic generator circuits 114 and 116 configured for generating streams of test packets, e.g., transmission control protocol/Internet protocol (TCP/IP) packets carrying test data. Each traffic generator circuit 114 and 116 includes one or more physical network ports. The traffic generator circuits 114 and 116 can be, e.g., test system load cards implemented using Field Programmable Gate Arrays (FPGAs). The traffic generator circuits 114 and 116 read stream configuration data from memory and generate streams of test packets based on the stream configuration data.

The test system 102 can test the DUT 104 by creating a LAG including links spread across the traffic generator circuits 114 and 116. Aggregating multiple physical links into a logical link can be useful, e.g., for increasing capacity without replacing low speed links, for high availability, and for load balancing. Examples of types of aggregations include static link aggregations, e.g., with manual link bunding, and dynamic link aggregations, e.g., with link bundling via LACP.

The test system 102 also includes a LAG controller 118 configured for carrying out a switchover of a link in a LAG from one test generator circuit to another test generator circuit. The LAG controller 118 can be implemented on the processors 106 and memory 108 or on one or both of the traffic generator circuits 114 and 116.

In some examples, the LAG controller 118 may be implemented with the test controller 110. The LAG controller 118 can initiate a switchover in response to detecting an anomaly such as a link failure, a link performing below a performance threshold, or a request for a link switchover received from the DUT 104.

In operation, the test controller 110 controls the traffic generator circuits 114 and 116 by sending instructions to the traffic generator circuits 114 and 116 and storing test-script specific stream configuration data in memory of the traffic generator circuits 114 and 116. For a given test script, the test controller 110 loads stream configuration data for multiple streams of test packets into memory of both traffic generator circuits 114 and 116. Then, when the LAG controller 118 carries out a switchover of a link in a LAG from one traffic generator circuit to the other, the traffic generator circuit can generate the appropriate stream of test packets using the stream configuration data that is already stored in the memory of the traffic generator circuit.

For example, consider an example test script that specifies creating a LAG with four links and four streams of test packets, one for each link of the LAG. Further suppose that the example test script specifies that two links of the LAG are generated on the first traffic generator circuit 114 using two streams of test packets and the other two links of the LAG are generated on the second traffic generator circuit 116 using the other two stream of test packets. In that case, the test controller 110 can store stream configuration data for all of the streams of packets on both of the traffic generator circuits 114 and 116, even though all of the stream configuration data is not initially needed by the traffic generator circuits 114 and 116.

Then, if the LAG controller 118 detects an anomaly on one of the links on the second traffic generator circuit 116, the LAG controller 118 can initiate a switchover for that link from the second traffic generator circuit 116 to the first traffic generator circuit 114. The first traffic generator circuit 114, after the switchover, generates the stream of test packets that the second traffic generator circuit 116 was generating prior to the switchover.

In some examples, the test controller 110 may implement asymmetric/partial mirroring of the stream configuration data. For example, test controller 110 can store stream configuration data for some but not all of the streams of test packets on some of the traffic generator circuits or in some memory areas of the traffic generator circuits. This may be useful, e.g., where some of the traffic generator circuits include sufficient processing resources to generate additional streams of test packets and some other traffic generator circuits lack such resources.

Figure 2:
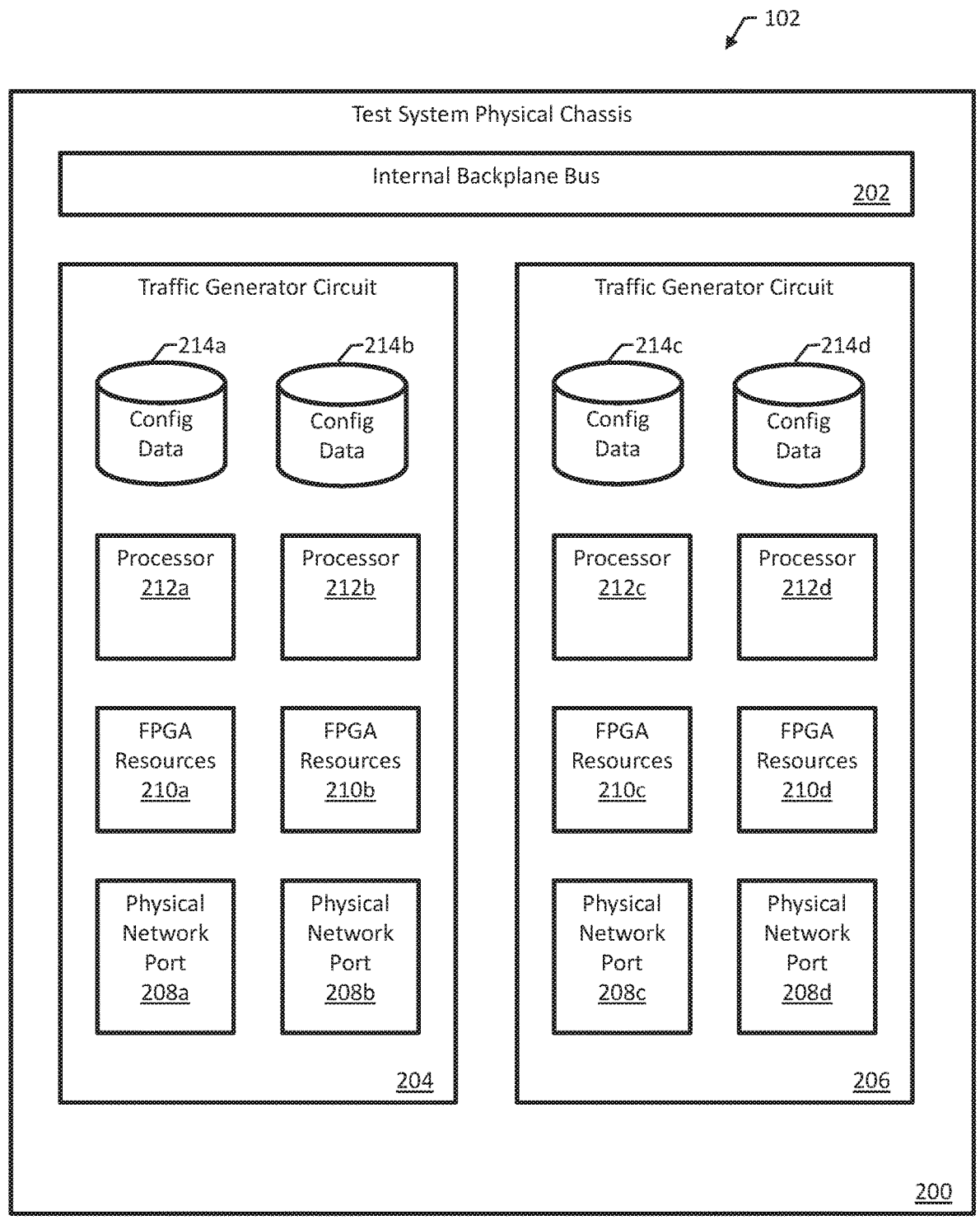
FIG. 2 is a block diagram of the test system housed in an example test system physical chassis.

FIG. 2 is a block diagram of the test system 102 housed in an example test system physical chassis 200. The test system 102 includes an internal backplane bus 202 coupling at least two traffic generator circuits 204 and 206. The traffic generator circuits 204 and 206 of FIG. 2 can be used to implement the traffic generator circuits 204 and 206 of FIG. 1. Only two traffic generator circuits each with two physical network ports are shown for purposes of illustration; in practice, the test system 102 may include varying numbers of traffic generator circuits with varying numbers of physical network ports.

The first traffic generator circuit 204 includes two physical network ports 208a-b, and the second traffic generator circuit 206 includes two physical network ports 208c-d. The physical network ports 208a-d can be, e.g., optical network ports, Ethernet ports, or any appropriate type of physical port connector/interface.

Each network port includes associated processing resources for the port, including FPGA resources 210a-d (a pool of FPGA resources for each network port), processors 212a-d, and port-specific test configuration data 214a-d. The port-specific test configuration data 214a-d can be stored, e.g., in separate physical memory for each physical network port 208a-d, or in shared memory for the traffic generator circuit housing the physical network port. Examples of port-specific test configuration data includes input parameters and configuration settings for the FPGA resources 210a-d, which are used by the FPGA resources to generate one or more streams of test packets.

In some examples, each of the traffic generator circuits 204 and 206 is configured, by virtue of conventional circuitry and hardware components, to carry out LAG link switchovers amongst the physical network ports located on the same traffic generator circuit. So the first traffic generator circuit 204 can carry out a link switchover between the first two physical network ports 208a-b, and the second traffic generator circuit 206 can carry out a link switchover between the last two physical network ports 208c-d. The traffic generator circuits 204 and 206 may, however, lack hardware components for supporting LAG link switchovers between physical network ports located on different traffic generator circuits.

The LAG controller 118 of FIG. 1 is configured to carry out LAG link switchovers between physical network ports located on different traffic generator circuits. The LAG controller 118 can be implemented, e.g., as a software layer for the processors 212a-d of the traffic generator circuits 204 and 206. The LAG controller 118 can be implemented as a distributed controller or by a LAG master program executing on one or the processors 212a-d.

Figure 3A:
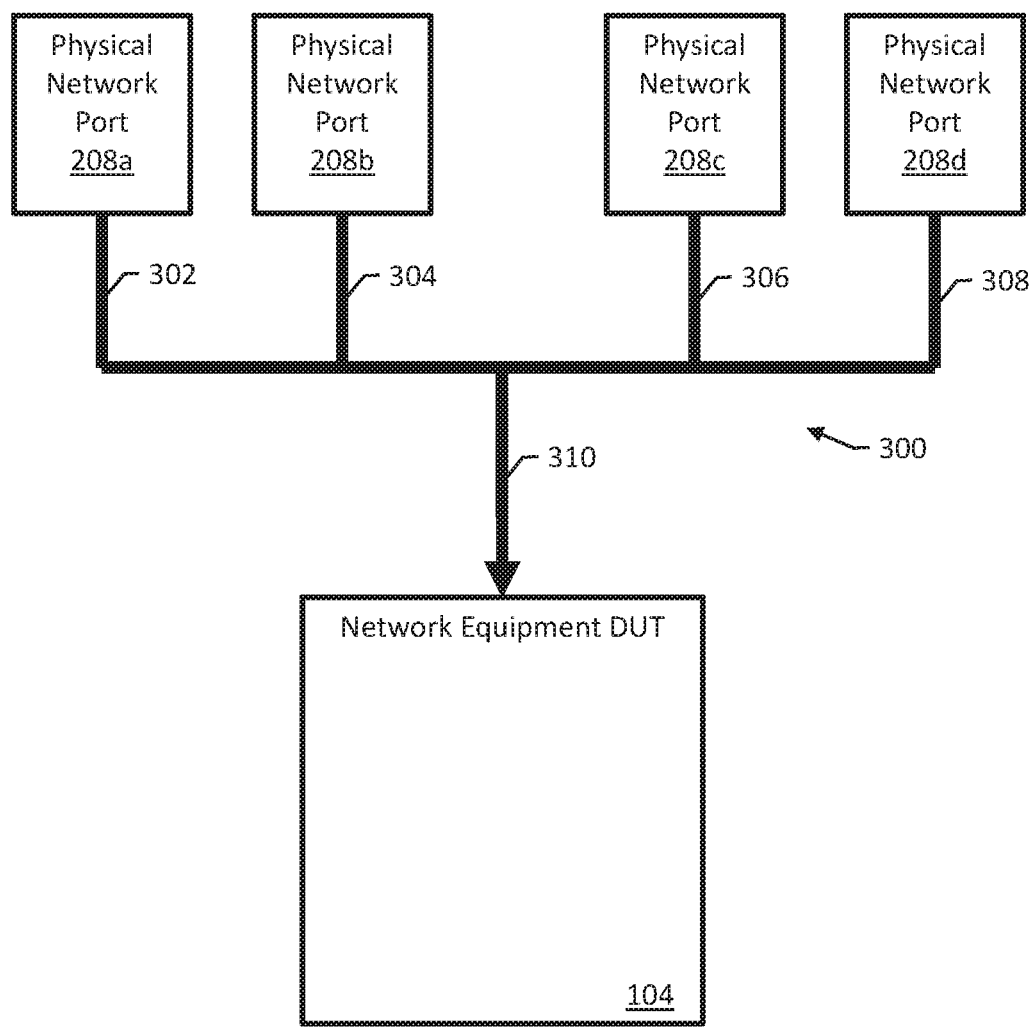
FIGS. 3A-3B illustrate an example of a LAG prior to a LAG link switchover.
Figure 3B:
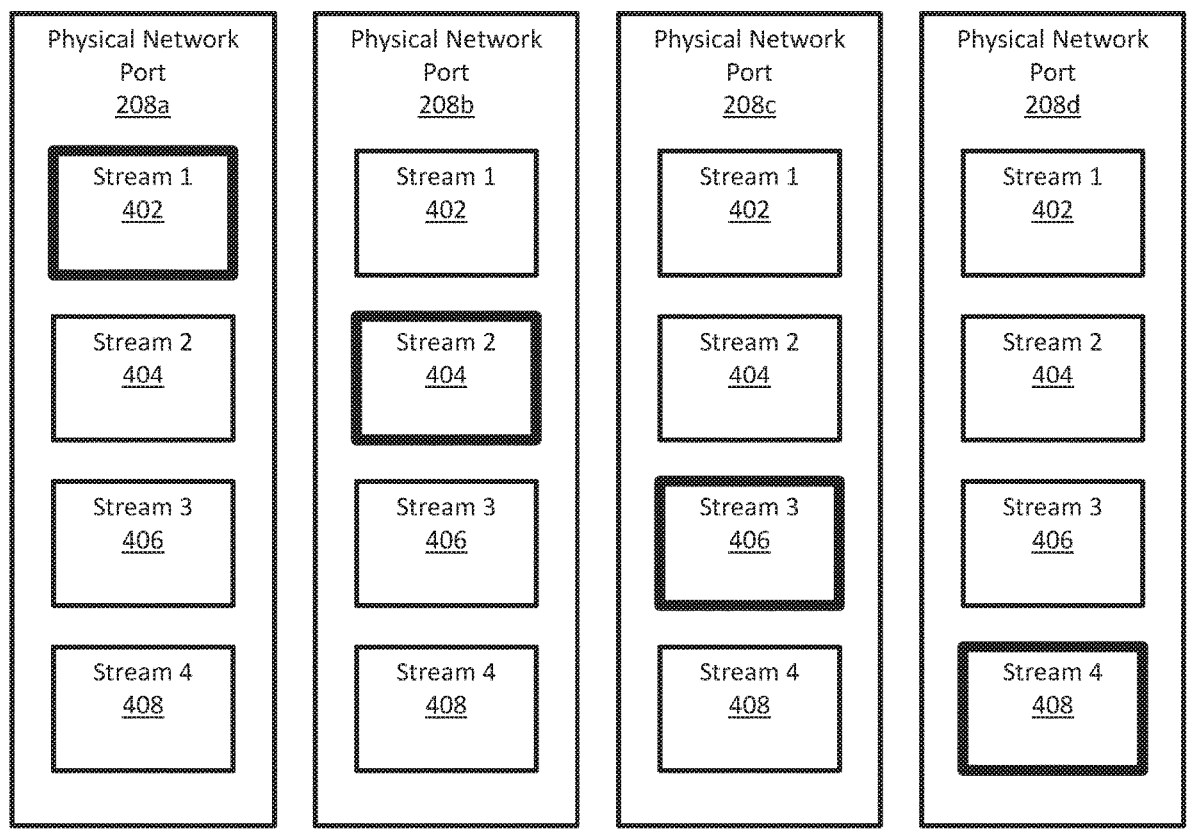
Figure 4A:
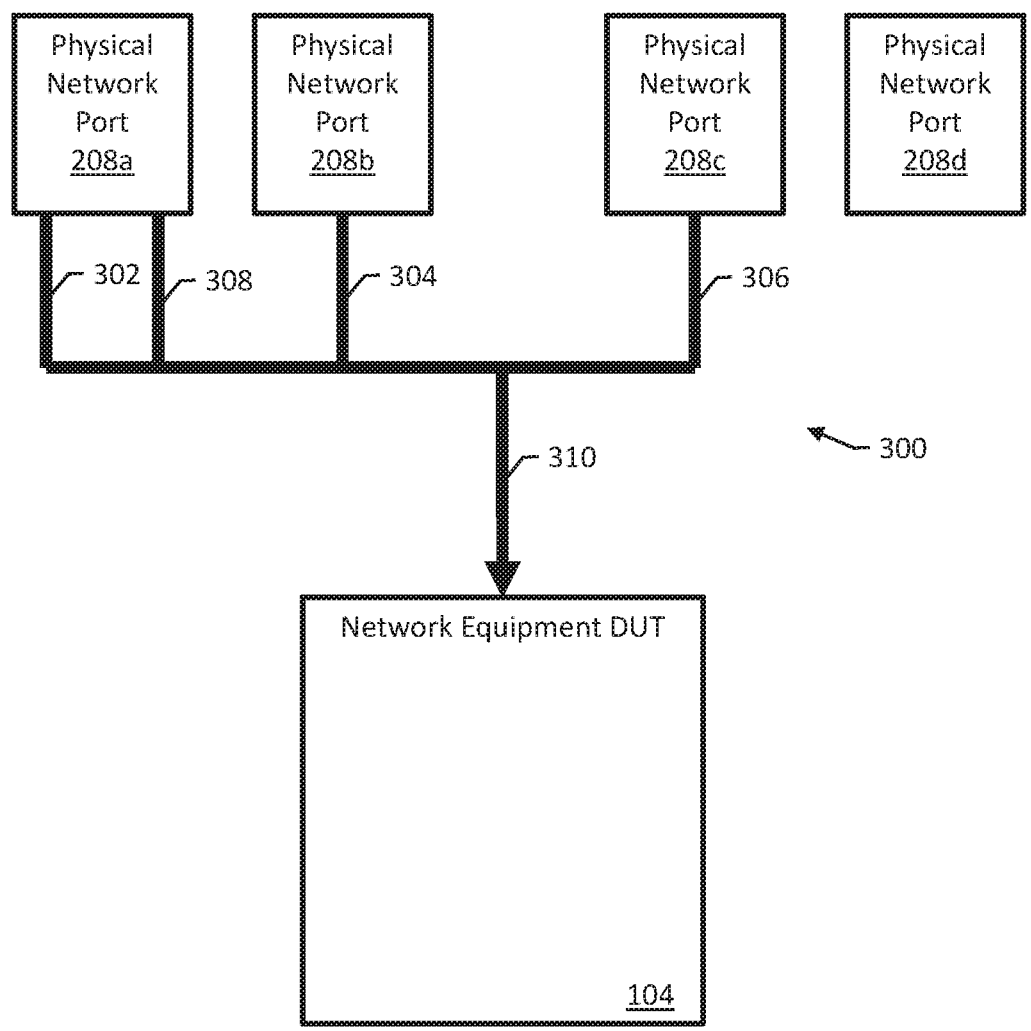
FIGS. 4A-4B illustrate the example LAG after the LAG link switchover.
Figure 4B:
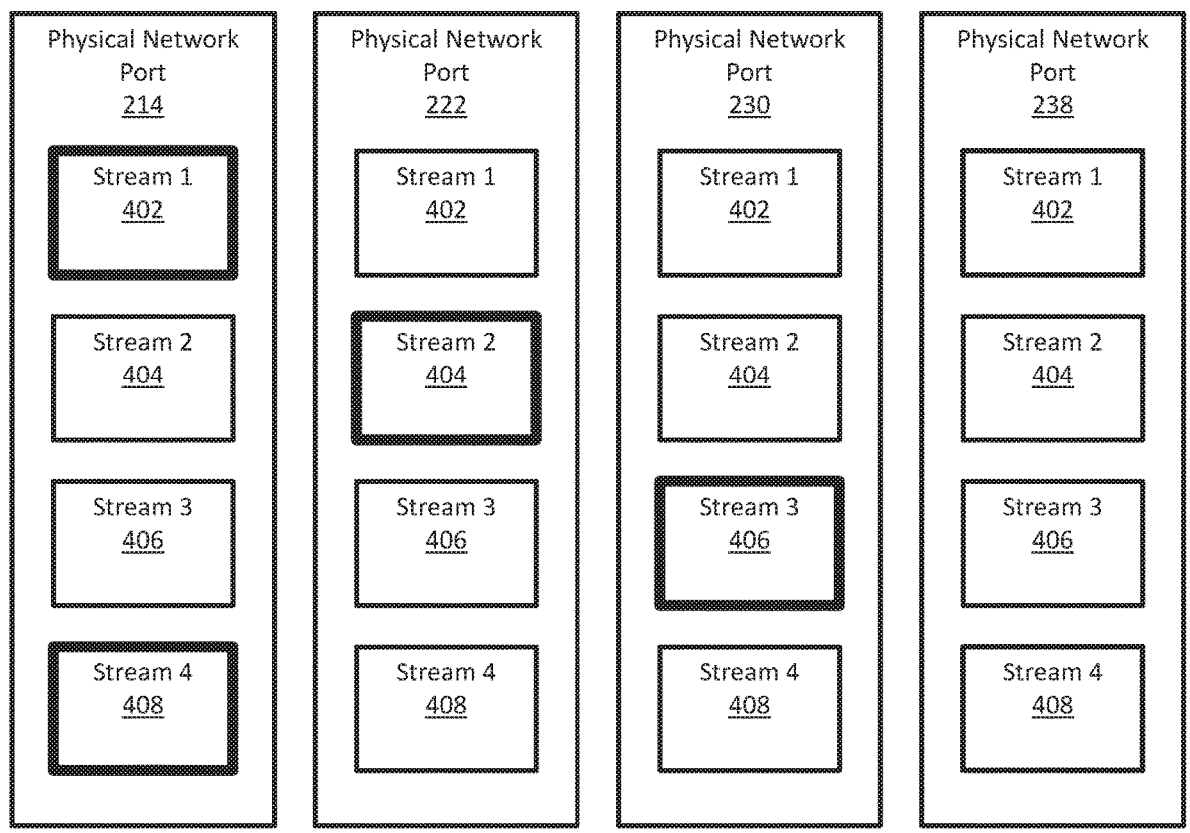

FIGS. 3A-3B and 4A-B illustrate an example of a LAG link switchover between the traffic generator circuits 204 and 206 carried out by the LAG controller 118. FIGS. 3A-3B show the LAG prior to the switchover and FIGS. 4A-4B show the LAG after the switchover. FIG. 3A illustrates an example LAG 300 implemented by the test system 102. The LAG 300 includes a first link 302 on the first physical network port 214, a second link 304. The LAG links are aggregated into a single logical link 310 for the DUT 104.

FIG. 3B illustrates the distribution of stream configuration data for the physical network ports 208a-d. As illustrated, an example test script specifies four streams of test packets for four links of the LAG 300. The test controller 110 programs processing resources associated with each of the physical network ports 208a-d with stream configuration data for a first stream 402, a second stream 404, a third stream 406, and a fourth stream 408.

Although the processing resources associated with each of the physical network ports 208a-d are programmed with the stream configuration data for all of the streams, each physical network port initially only generates one stream of test packets, i.e., one stream is "active" as shown by the bold borders of FIG. 3B. Prior to the LAG link switchover, the first physical network port 208a sends the first stream 402 over a first link 302 of the LAG 300, and the second physical network port 208b sends the second stream 404 over the second link 304 of the LAG 300. The third physical network port 208c sends the third stream 406 over the third link 306 of the LAG 300, and the fourth physical network port 208d sends the fourth stream 408 over the fourth link 308 of the LAG 300.

Suppose that the LAG controller 118 detects an anomaly on the fourth link 308 of the LAG 300. The LAG controller 118 can determine, e.g., by accessing set of LAG switchover rules associated with the test script, to transfer the fourth link 308 of the LAG to the first physical network port 208a. The LAG switchover rules can specify, e.g., which of the other physical network ports 208a-c has enough processing resources to handle the additional traffic carried on the fourth link 308 of the LAG 300.

In response to detecting the anomaly, the LAG controller 118 instructs the fourth physical network port 208d to cease generating the fourth stream 408 of test packets. The LAG controller 118 instructs the first physical network port 208a to generate both the first stream 402 and the fourth stream 408 using the stream configuration data. Instructing the port processors can include communicating over an internal backplane bus of a test system physical chassis, e.g., the internal backplane bus 202 of the test system physical chassis 200 of FIG. 2.

FIG. 4A shows the LAG 300 after the switchover. The first physical network port 208a implements the first link 302 of the LAG 300 and the fourth link 308 of the LAG. The fourth physical network port 208d is inactive. FIG. 4B shows the distribution of traffic stream distribution across the physical network ports after the switchover. As indicated by the bold borders, the first traffic generator circuit 204 generates the first stream 402 and the fourth stream 408.

For some test scripts, the traffic generator circuits 204 and 206 are configured to insert stream identifiers into packets of each stream of test packets. In some examples, to reduce or eliminate test packet sequence number issues, at the time of the switchover, the LAG controller 118 causes the first traffic generator circuit 204 to use the stream identifier for the fourth stream 408 on the fourth link 308 and the stream identifier for the first stream 402 on the first link 302.

In the example shown in FIGS. 3A-B and 4A-B, the stream configuration data for all of the stream is mirrored evenly across the traffic generator circuits such that the traffic generator circuits are configured to generated any stream of test packets on any physical network port. In some other examples, the stream configuration data may be asymmetrically or partially mirrored. For example, if the second traffic generator circuit 206 lacked the stream configuration data for the first and second streams, the LAG switchover illustrated in FIGS. 3A-B and 4A-B could still be carried out, but a similar switchover from the first traffic generator circuit 204 to the second traffic generator 206 would not be possible.

This may be appropriate in situations where, e.g., different traffic generator circuits include varying processing resources. The test controller 110 can, e.g., mirror the stream configuration data onto some traffic generator circuits having more processing resources and not mirror the stream configuration data onto other traffic generator circuits having fewer processing resources.

Figure 5:
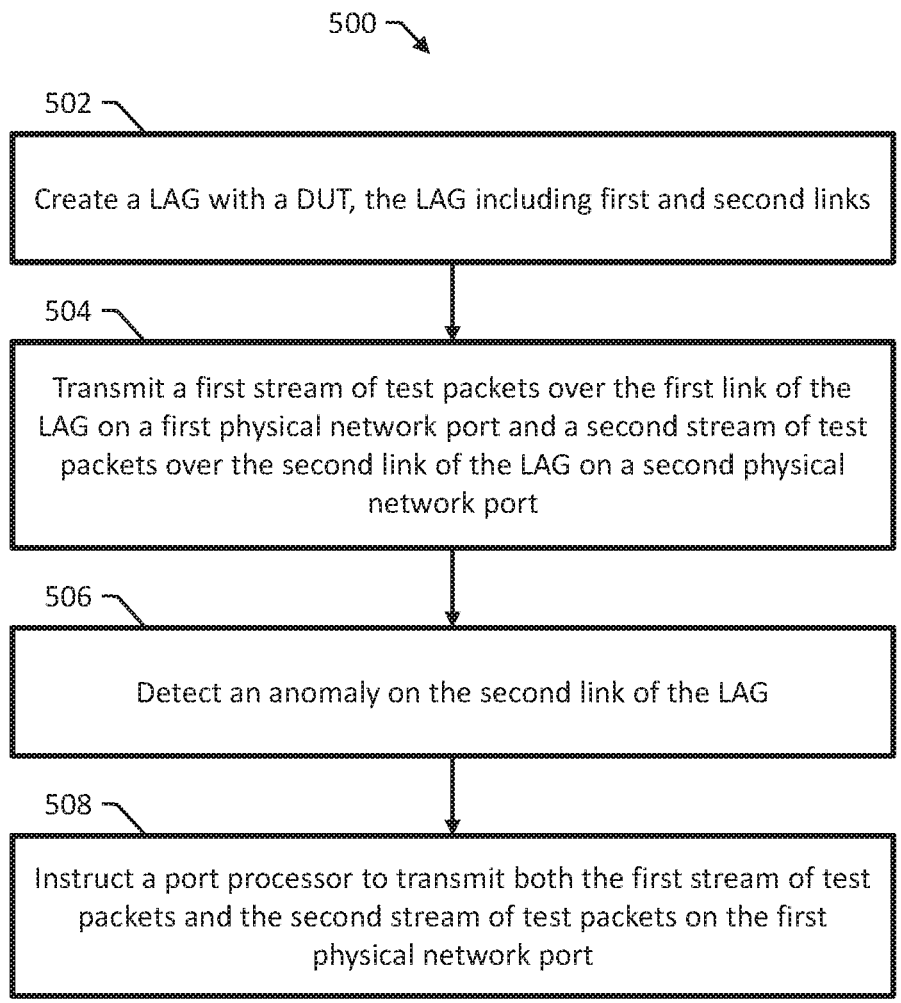
FIG. 5 is a flow chart of an example method 500 for LAG switching in a network testing environment.

FIG. 5 is a flow chart of an example method 500 for LAG switching in a network testing environment. The method 500 can be performed, e.g., by the test system 102 of FIG. 1. The method 500 includes creating a LAG with at least one DUT for testing the DUT (502). The LAG includes a first link and a second link aggregated into a single logical link.

The method 500 includes transmitting, from a first traffic generator circuit, a first stream of test packets over the first link of the LAG on the first physical network port (504). The first traffic generator circuit includes at least a first physical network port and a first port processor.

The first traffic generator circuit includes memory storing stream configuration data for both the first stream and a second stream for testing the DUT. The first port processor is configured, initially, to transmit the first stream of test packets using the stream configuration data for the first stream and, and after the switchover, to transmit the second stream of test packets using the stream configuration data for the second stream.

The method 500 includes transmitting, from a second traffic generator circuit, a second stream of test packets over the second link of the LAG on the second physical network port (506). The second traffic generator circuit includes at least a second physical network port and a second port processor. The second traffic generator circuit includes memory storing stream configuration data for both the first stream and the second stream. The second port processor is configured, initially, to transmit the second stream of test packets using the stream configuration data for the first stream and, and after the switchover, to cease transmitting the second stream of test packets.

The method 500 includes detecting an anomaly on the second link and, in response to detecting the anomaly, instructing the first port processor to transmit both the first stream of test packets and the second stream of test packets on the first physical network port (508). Detecting an anomaly on the second link can include receiving notification of a failure of the second link. In some examples, the method 500 includes selecting, from among a number of other LAG links, the first link of the LAG for carrying the first stream of test packets based on one or more LAG switchover rules. In some examples, the method 500 includes receiving a stream of response test packets and generating a test report for the DUT based on the stream of response test packets.

In some examples, the method 500 includes inserting, using the second port processor, a stream identifier for the second stream of test packets into each of the test packets of the second stream of test packets transmitted on the second physical network port. Then, the method 500 includes inserting, using the first port processor after the switchover, the stream identifier for the second stream of test packets into each of the test packets of the second stream of test packets transmitted on the first physical network port.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for link aggregation group (LAG) switching in a network testing environment, the system comprising:
   a test controller configured for testing at least one device under test (DUT), wherein testing the DUT comprises creating a link aggregation group (LAG) with the DUT, the LAG including a first link and a second link aggregated into a single logical link;
   a first traffic generator circuit comprising at least a first physical network port and a first port processor configured to transmit a first stream of test packets over the first link of the LAG on the first physical network port;
   a second traffic generator circuit comprising at least a second physical network port and a second port processor configured to transmit a second stream of test packets over the second link of the LAG on the second physical network port; and a LAG controller configured for detecting an anomaly on the second link and, in response to detecting the anomaly, instructing the first port processor to generate and transmit both the first stream of test packets and the second stream of test packets on the first physical network port;

wherein the first traffic generator circuit comprises memory storing stream configuration data for both the first stream and the second stream for testing the DUT, and wherein the first port processor is configured to generate and transmit the first stream of test packets using the stream configuration data for the first stream and to generate and transmit the second stream of test packets using the stream configuration data for the second stream.

2. The system of claim 1, wherein the first traffic generator circuit comprises a plurality of physical network ports and, for each physical network port, a port processor, a pool of field programmable gate array (FPGA) resources, and a stream configuration data store storing stream configuration data for generating a stream of packets for testing the DUT.

3. The system of claim 1, wherein the wherein the first traffic generator circuit comprises memory storing stream configuration data for both the first stream and the second stream for testing the DUT, and wherein the second traffic generator circuit comprises memory storing the stream configuration data for both the first stream and the second stream for testing the DUT.

4. The system of claim 1, wherein the LAG controller is implemented on the first port processor of the first traffic generator circuit or the second port processor of the second traffic generator circuit.

5. The system of claim 1, wherein the LAG controller is configured for selecting, from among a plurality of other LAG links, the first link of the LAG for carrying the first stream of test packets based on one or more LAG switchover rules.

6. The system of claim 1, wherein the second port processor is configured to insert a stream identifier for the second stream of test packets into each of the test packets of the second stream of test packets transmitted on the second physical network port, and wherein, the first port processor is configured, after being instructed by the LAG controller to transmit the second stream of test packets, to insert the stream identifier for the second stream of test packets into each of the test packets of the second stream of test packets transmitted on the first physical network port.

7. The system of claim 1, wherein detecting an anomaly on the second link comprises receiving notification of a failure of the second link.

8. The system of claim 1, wherein the test controller is configured to receive a stream of response test packets and to generate a test report for the DUT based on the stream of response test packets.

9. The system of claim 1, comprising a test system physical chassis housing the first and second test traffic generator circuits and coupling the first and second test traffic generator circuits by an internal backplane bus.

10. A method for link aggregation group (LAG) switching in a network testing environment, the method comprising:

creating a link aggregation group (LAG) with at least one device under test (DUT) for testing the DUT, the LAG including a first link and a second link aggregated into a single logical link;

transmitting, from a first traffic generator circuit comprising at least a first physical network port and a first port processor, a first stream of test packets over the first link of the LAG on the first physical network port;

transmitting, from a second traffic generator circuit comprising at least a second physical network port and a second port processor, a second stream of test packets over the second link of the LAG on the second physical network port; and detecting an anomaly on the second link and, in response to detecting the anomaly, instructing the first port processor to generate and transmit both the first stream of test packets and the second stream of test packets on the first physical network port;

wherein the first traffic generator circuit comprises memory storing stream configuration data for both the first stream and the second stream for testing the DUT, and wherein the first port processor is configured to generate and transmit the first stream of test packets using the stream configuration data for the first stream and to generate and transmit the second stream of test packets using the stream configuration data for the second stream.

11. The method of claim 10, wherein the first traffic generator circuit comprises a plurality of physical network ports and, for each physical network port, a port processor, a pool of field programmable gate array (FPGA) resources, and a stream configuration data store storing stream configuration data for generating a stream of packets for testing the DUT.

12. The method of claim 10, wherein the wherein the first traffic generator circuit comprises memory storing stream configuration data for both the first stream and the second stream for testing the DUT, and wherein the second traffic generator circuit comprises memory storing the stream configuration data for both the first stream and the second stream for testing the DUT.

13. The method of claim 10, wherein the second traffic generator circuit is configured for instructing the first port processor to transmit both the first stream of test packets and the second stream of test packets on the first physical network port.

14. The method of claim 10, comprising selecting, from among a plurality of other LAG links, the first link of the LAG for carrying the first stream of test packets based on one or more LAG switchover rules.

15. The method of claim 10, wherein the second port processor is configured to insert a stream identifier for the second stream of test packets into each of the test packets of the second stream of test packets transmitted on the second physical network port, and wherein, the first port processor is configured, after being instructed by the LAG controller to transmit the second stream of test packets, to insert the stream identifier for the second stream of test packets into each of the test packets of the second stream of test packets transmitted on the first physical network port.

16. The method of claim 10, wherein detecting an anomaly on the second link comprises receiving notification of a failure of the second link.

17. The method of claim 10, comprising receiving a stream of response test packets and generating a test report for the DUT based on the stream of response test packets.

18. The method of claim 10, wherein instructing the first port processor to transmit both the first stream of test packets and the second stream of test packets on the first physical network port comprises communicating over an internal backplane bus of a test system physical chassis.

* * * * *